US009754034B2

(12) United States Patent
Chilakamarri et al.

(10) Patent No.: US 9,754,034 B2
(45) Date of Patent: Sep. 5, 2017

(54) CONTEXTUAL INFORMATION LOOKUP AND NAVIGATION (71) Applicant: Microsoft Corporation, Redmond, WA (US)

(72) Inventors: Pradeep Chilakamarri, Redmond, WA (US); Bernhard S. J. Kohlmeier, Seattle, WA (US); Kristen M. Saad, Redmond, WA (US); Constance Gwendolyn Duong, Seattle, WA (US); Lin Ma, Mercer Island, WA (US); Annie Y. Bai, Seattle, WA (US); Lorrissa Reyes, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

(21) Appl. No.: 14/091,847

(22) Filed: Nov. 27, 2013

(65) Prior Publication Data

US 2015/0149429 A1 May 28, 2015

(51) Int. Cl.
G06F 17/30 (2006.01)
G06F 9/44 (2006.01)

(52) U.S. Cl.
CPC ...... *G06F 17/30867* (2013.01); *G06F 9/4446* (2013.01); *G06F 17/30* (2013.01); *G06F 17/30864* (2013.01)

(58) Field of Classification Search
CPC .. G06F 17/30014; G06F 17/243; G06F 3/017; G06F 3/005; G06F 17/30554; G06F 17/30528
See application file for complete search history.

(56) References Cited

U.S. PATENT DOCUMENTS 8,365,059 B2 1/2013 Walsh et al.
2006/0026013 A1 2/2006 Kraft
(Continued)

FOREIGN PATENT DOCUMENTS

WO 2007064639 A2 6/2007

OTHER PUBLICATIONS

"International Search Report and Written Opinion Issued in PCT Application No. PCT/US2014/066487", Mailed Date: Feb. 16, 2015, 13 Pages.
Collins, et al., "DocuBurst: Visualizing Document Content using Language Structure", In Computer Graphics Forum, vol. 28, Issue 3, Jun. 2009, 8 pages.
(Continued)

*Primary Examiner* — Mariela Reyes
*Assistant Examiner* — Courtney Harmon
(74) *Attorney, Agent, or Firm* — Talem IP Law, LLP (57) ABSTRACT Techniques and systems for facilitating contextual information lookup and navigation are presented. Contextually relevant information can be presented without requiring a user to switch context or craft a search query. From within an application in which a user may consume or create content, a user may indicate text for further exploration. The application can receive the indication of an initial text selection, determine the intended selection and provide contextual search results to the user. In some implementations, the initial selection and a selection context (that includes at least some of the text surrounding the initial selection) is sent to a contextual search service which provides the intended selection and contextual search results based on the initial selection and selection context. In other implementations, text may be suggested by the contextual search service for selection from within the application.

21 Claims, 9 Drawing Sheets (56) References Cited

U.S. PATENT DOCUMENTS

| | | | |
|---|---|---|---|
| 2006/0026147 A1* | 2/2006 | Cone | G06F 17/30867 |
| 2007/0208751 A1* | 9/2007 | Cowan | G06Q 30/02 |
| 2008/0133504 A1 | 6/2008 | Messer et al. | |
| 2010/0241507 A1* | 9/2010 | Quinn | G06Q 30/02 |
| | | | 705/14.42 |
| 2011/0161182 A1* | 6/2011 | Racco | G06Q 30/0277 |
| | | | 705/14.73 |
| 2011/0276581 A1* | 11/2011 | Zelevinsky | G06N 5/02 |
| | | | 707/766 |
| 2012/0151310 A1 | 6/2012 | El-kalliny | |
| 2012/0254188 A1* | 10/2012 | Koperski | G06F 17/30663 |
| | | | 707/740 |
| 2013/0007004 A1* | 1/2013 | Rai | G06F 17/30622 |
| | | | 707/742 |

OTHER PUBLICATIONS

Schilit, et al., "Beyond Paper: Supporting Active Reading with Free Form Digital Ink Annotations", In Proceedings of the SIGCHI Conference on Human Factors in Computing Systems, Apr. 18, 1998, 8 pages.

Paris, et al., "Capturing the user's Reading Context for Tailoring Summaries", In Proceedings of 17th International Conference User Modeling, Adaptation, and Personalization, Jun. 22, 2009, 6 pages.

Parr, Ben, "Google Now Lets You Preview Search Results Before You Click Them", Published on: Nov. 9, 2010, Available at: http://mashable.com/2010/11/09/google-instant-previews/.

"Second Written Opinion Issued in PCT Application No. PCT/US2014/066487", Mailed Date: Jun. 29, 2015, 4 Pages.

"International Preliminary Report on Patentability Issued in PCT Application No. PCT/US2014/066487", Mailed Date: Sep. 9, 2015, 10 Pages.

\* cited by examiner

CONTEXTUAL INFORMATION LOOKUP AND NAVIGATION

BACKGROUND

Users of applications consuming or creating content often rely on internet search services to find additional information related to one or more terms or topics found in the content. To use the search services, a user will often leave the application and go to a web browser to perform a search and review the results. Sometimes the user may perform the search on a second device, for example, the application that the user is using to consume or create content may be on one device and then the user may access a browser on a second device (e.g., a mobile browser on a phablet or phone) to perform a search on the term or topic.

The separate search may be distracting to a user's workflow and even unproductive for many users, for example when a user leaves an application to enter terms for a search query. Furthermore, when the user switches to a different application to craft the search, the context of the content the user is working with may not be easily conveyed to a search engine since it is up to the user to provide key terms to indicate the context of the search. This can result in the search returning unrelated results and/or requiring multiple attempts by the user to narrow or modify a search query in order to achieve a relevant result.

BRIEF SUMMARY

Techniques and systems for facilitating contextual information lookup and navigation are presented. A user experience is described in which contextually relevant information can be presented without requiring a user to switch contexts or craft a search query.

Instead of switching context, a user who would like additional information about an item or topic in content within an application may indicate interest in certain text of the content. The portion of the text indicated by the user, along with additional text around the portion of the text selected by the user, can be used to determine the intended items or topics for exploration. One or more queries can be generated from the determined intended items or topics. In addition, relevant results can be presented to the user based on the determined intended items or topics.

Certain implementations utilize a contextual search service. The contextual search service includes functionality and logic for producing contextually relevant information including results that are related through context and not just from a conventional search. In one such implementation, the portion of the text indicated by the user, along with additional text around the portion of the text selected by the user, is sent to the contextual search service, which performs a determination as to the intended item or topic for search. The contextual search service can provide one or more proposed terms found in the text selected by the user (as well as in the additional text) for the selection along with relevant results obtained from one or more queries generated based on the one or more proposed terms.

The proposed terms for the selection can be indicated as identified terms in the application using a visual motif so that the user is made aware of what the application understands the user's intent to be.

In addition, a hierarchical interface can be presented within the original application context for displaying and navigating the results that are organized, for example, by source. According to certain implementations, when search results are received, a preview of the results, grouped into modules according to source, can be displayed non-obtrusively along with the user's original application surface. This may involve rendering a pane in a same window or display screen of the user's device. When the user selects a search result within the preview interface or selects an expanded view, an interactive, expanded view containing the search results may replace the preview interface enabling a deeper exploration of the results. A user may select links or elements shown in the interface to conduct a deeper exploration of the results while remaining within the expanded view. Navigation through the levels of information can be carried out while within the application. In some implementations, the hierarchical interface may be presented on a different device in response to receiving the results (or by command of the user).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Embodiments described herein enable a user seamlessly to retrieve additional information about content displayed in an application without having to leave the context (and even interface) of the application.

The application may be a program whose purpose includes the reading, writing, or arranging of text which is conducive to searching. Example applications include word processing applications such as MICROSOFT WORD; email applications; layout applications; and note-taking applications such as MICROSOFT ONENOTE, EVERNOTE, and GOOGLE KEEP.

Certain implementations may be associated with a reader. A "reader" refers to a software application and/or electronic device designed primarily for the purpose of reading electronic books (ebooks) and/or other electronic content. Example software ebook readers include Google Reader, Apple iBooks, Acrobat eBook Reader, Amazon Kindle Reader, and Microsoft Reader applications. Example hardware ebook readers include the Amazon Kindle and Barnes and Noble Nook. An ebook is a text and/or image based publication in digital form that can be read on an ebook reader.

One step towards facilitating minimizing the distraction of switching context between an application in which a user is creating or consuming content and a web search is to provide a user experience that displays search results beside document content. Of course, it should be noted that implementations of the techniques described herein are suitable for scenarios in which results are surfaced in a device that is different than the one in which the user is consuming or creating content.

The replication of a web search interface in a task pane can provide a user with the ability to conduct a search on a topic, term, or other item while remaining in the document. However, whether within the content consumption/creation application or as a separate application, a web search interface requires a user to determine the terms of a search query and leaves the user with the task of engaging with the search interface and crafting the appropriate query to obtain contextually relevant information. Thus, to further improve a user's experience in the systems and techniques described herein, a query can be generated for the user in response to a user indicating interest in certain text from within a document.

Embodiments are described herein that enable a user to indicate interest in certain text from within the document (without requiring the entering of search terms into a search field) and receive contextually relevant results based on a query generated by the application (either directly or via communicating with a contextual search service). The user may be informed of the text that the application believes the user has selected for searching (e.g., a selection of text that is shaped into a potentially more contextually relevant search text) and, in some cases, the user may also be informed of the contextual terms used by the application to craft the search. Further embodiments allow the user to preview and explore the search results for additional information by displaying interactive interfaces which do not require the user to switch away from the existing application.

Although examples are described in which a results pane is presented within or beside the application interface, certain implementations contemplate the search pane being provided separately from the application (and even on a separate device) so long as the search results can be generated without requiring entry of a search query directly by a user.

Figure 1A:
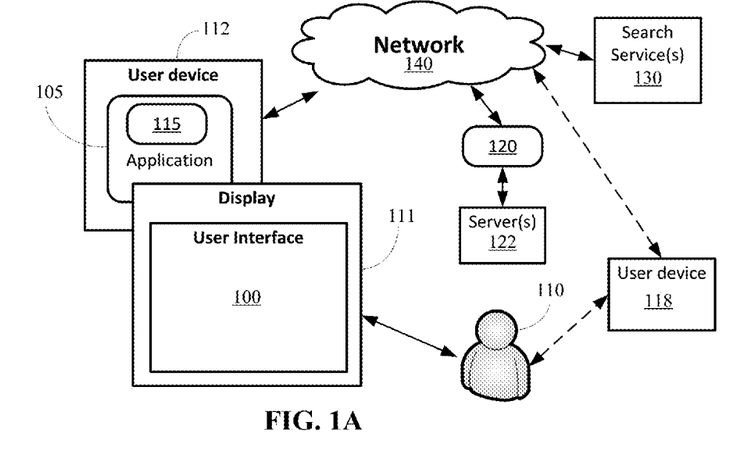
FIG. 1A illustrates an operating environment in which certain implementations of the contextual information lookup and navigation experience may be carried out.
Figure 1B:
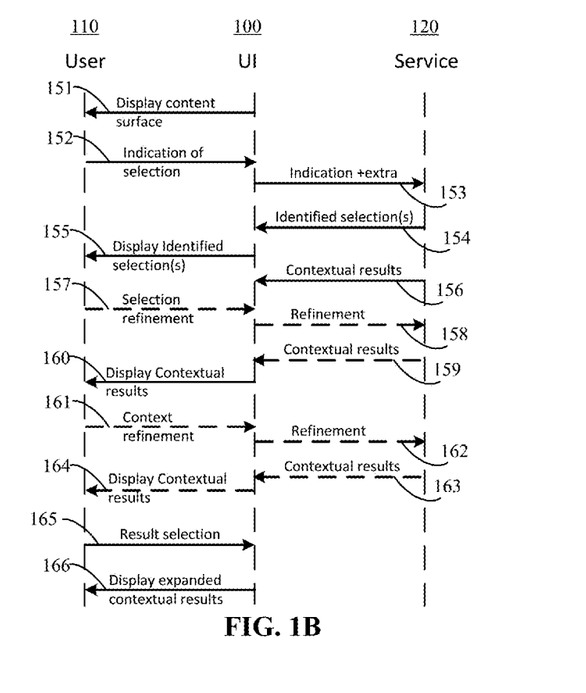
FIG. 1B illustrates an example process flow for contextual information lookup and navigation.

FIG. 1A illustrates an operating environment in which certain implementations of a contextual information lookup and navigation experience may be carried out; and FIG. 1B illustrates an example process flow for contextual information lookup and navigation.

Figure 8:
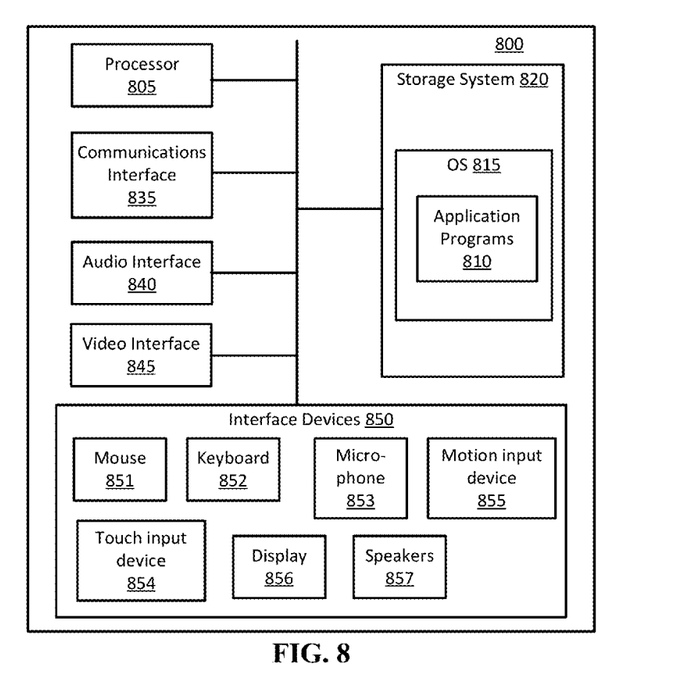
FIG. 8 is a block diagram illustrating components of a computing device or system used in some embodiments.

Referring to FIG. 1A, a user interface (UI) 100 of an application 105 in which a user 110 is consuming or creating content can be rendered on a display 111 of a user device 112. The application 105 may run directly on the user device 112 or via a browser running on the user device 112. The user device 112 may be, but is not limited to, a personal computer, a laptop computer, a desktop computer, a tablet computer, a reader, a mobile device, a personal digital assistant, a smart phone, a gaming device or console, a wearable computer with an optical head-mounted display, computer watch, or a smart television, of which computing system 800, discussed below with respect to FIG. 8, is representative.

The UI 100 can be influenced by a contextual search component 115 of the application 105. The contextual search component 115 may be in the form of one or more software modules of the application 105. The contextual search component 115 may provide instructions to carry out one or more of the methods for facilitating contextual information lookup and navigation described herein. Some aspects of the contextual information look up and navigation are performed on the user device 112 and rendered for display in the user interface 100, while other aspects may be performed, at least in part, by a contextual search service 120. In some cases, some aspects of the contextual information look up and navigation may be rendered for display on a separate device 118, which may be, but is not limited to a personal computer, a laptop computer, a desktop computer, a tablet computer, a reader, a mobile device, a personal digital assistant, a smart phone, a gaming device or console, a wearable computer with an optical head-mounted display, computer watch, or a smart television, of which computing system 800, discussed below with respect to FIG. 8, is representative.

Various types of physical or virtual computing systems may be used to implement the contextual search service 120, such as server computers, desktop computers, laptop computers, tablet computers, smart phones, or any other suitable computing appliance. When implemented using a server computer 122, any of a variety of servers may be used including, but not limited to, application servers, database servers, mail servers, rack servers, blade servers, tower servers, or any other type server, variation of server, or combination thereof.

The contextual search component 115 may interact with the contextual search service 120 over a network. The network can include, but is not limited to, a cellular network (e.g., wireless phone), a point-to-point dial up connection, a satellite network, the Internet, a local area network (LAN), a wide area network (WAN), a Wi-Fi network, an ad hoc network or a combination thereof. Such networks are widely used to connect various types of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as will be understood by those skilled in the art.

In certain implementations, the contextual search component 115 facilitates the interaction between a user 110 interacting with the UI 100 and the contextual search service 120 using an application programming interface (API) of the contextual search service 120.

An API is generally a set of programming instructions and standards for enabling two or more applications to communicate with each other and is commonly implemented as a set of Hypertext Transfer Protocol (HTTP) request messages and a specified format or structure for response messages according to a REST (Representational state transfer) or SOAP (Simple Object Access Protocol) architecture.

In response to receiving particular user interaction's with the UI 100, the contextual search component 115 may facilitate a call (or invocation) of a contextual search service 120 using the API of the contextual search service 120. The contextual search service can then perform a determination of the user's intended text selection based on information provided by the contextual search component 115 and construct one or more queries for requesting a search from one or more search services 130. The search services 130 may include web search engines such as, but not limited to, Microsoft Bing and Google, and intranet search such as FAST Search.

The results of the determination and search can be returned to the user device 112 (e.g., for the contextual search component 115). The contextual search component 115 can then surface elements in the UI 100 based on the information received from the contextual search service 120.

In some cases, at least some of the results of the determination and search may be sent to a separate device 118, which may include one or more components related to the application 105 and/or the contextual search component 115. For example, a user 110 may be using multiple devices either simultaneously or at different times. For a scenario where the user is interacting with two devices (e.g., 112 and 118), the application 105 and/or contextual search component 115 may be running on both devices and at least some of the information received from the contextual search service 120 can be received on the device in which the user 110 is not directly consuming the content (via the application 105). For example, a navigable user interface may be provided on the separate device (e.g., device 118) in which the relevant results may be selectively surfaced.

In more detail, as illustrated in FIG. 1B, content in the form of a document (including any format type document), article, picture (e.g., that may or may not undergo optical character recognition), book, and the like may be displayed (151) through the UI 100. The contextual information lookup process flow may begin with a user interacting with an application surface containing text (or other readily web-searchable content). For example, a user can indicate an initial selection of text for contextual search (152). Interaction by the user with the UI 100 indicating the initial text selection may take myriad forms. The input indicating text selection can include, but is not limited to, a verbal selection (of one or more words or phrases), contact or contact-less gestural selection, touch selection (finger or stylus), swipe selection, cursor selection, encircling using a stylus/pen, or any other available technique that can be detected by the user device 112. In some implementations, contextual information lookup may initiate without an active selection by a user.

The user may also, for instance, utilize a device which is capable of detecting eye movements, and the device might detect that the user's eye lingers on the text for a length of time, indicating the user's interest in selecting the text for contextual searching. A computing device capable of detecting voice commands might recognize a spoken command to initially select text for contextual information lookup. It should also be noted that many other user interface elements, as diverse as drop-down menus, buttons, or right-click context menus, may signify that the user has set an initial text selection. Further, it can be understood that an initial text selection may involve some or all of the text available on the document, page, or window.

FIGS. 2A-2D illustrate example interactions indicating an initial selection of text for contextual search.

Figure 2A:
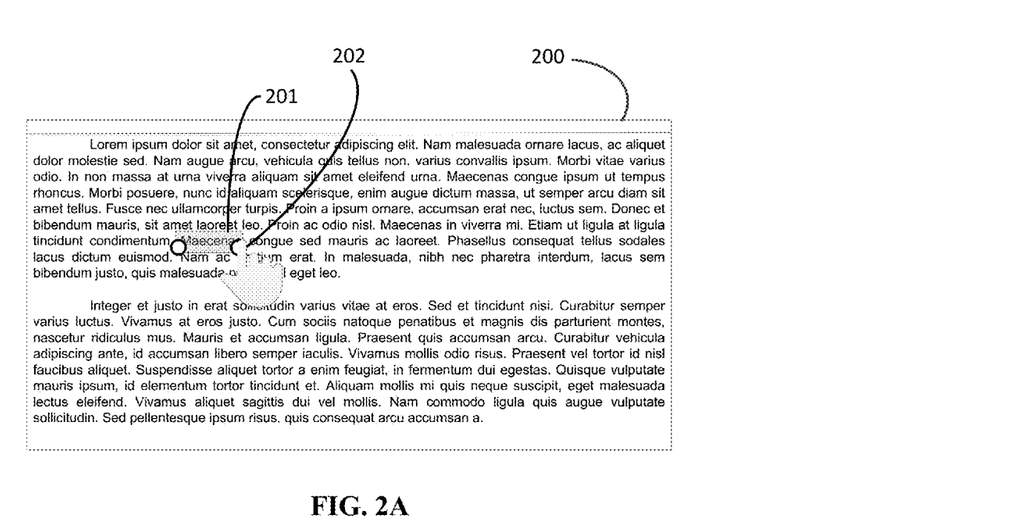
FIGS. 2A-2D illustrate example interactions indicating an initial selection of text for contextual search.

As one example, in a user interface 200 in which text is depicted, the user may select a word (or phrase) 201. The selection of the word (or phrase) may be a swipe gesture 202 on a touch enabled display screen such as illustrated in FIG. 2A. Other gestures such as insertion point, tap, double tap, and pinch could be used. Of course, non-touch selection of a word (as well as cursor selection of the word) is possible. In the example shown in FIG. 2B, a cursor 203 may be used to indicate, for example, via a mouse click, a point on the surface of the user interface 200. The cursor 203 may be placed within a term without highlighting a word or words. A similar selection may be conducted by touch (e.g., using a finger or pen/stylus).

Just as less than a full word can be indicated by the user as the initial selection of text, a user may select more than a single word using any of the methods of user interaction described above.

Figure 2B:
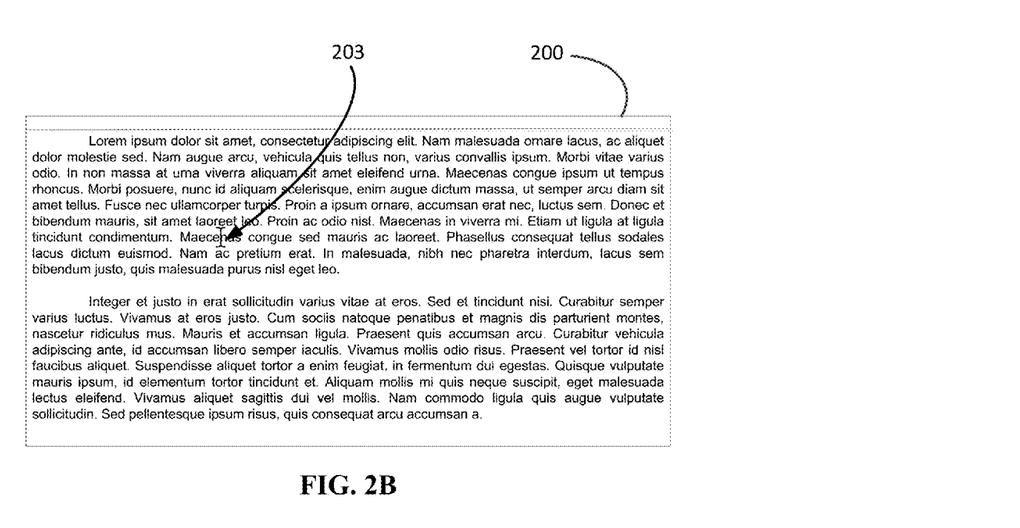
Figure 2C:
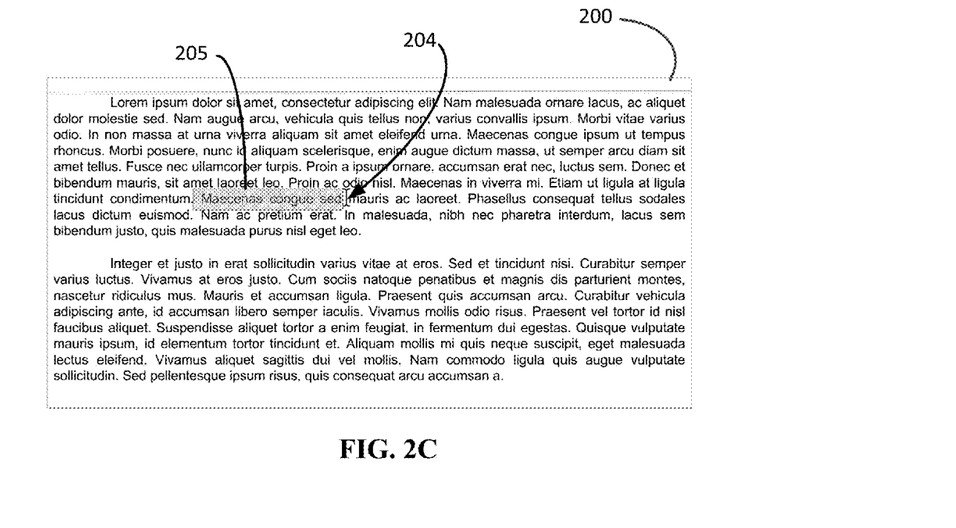

For example, multiple words may be "marked" by the user using interface techniques such as illustrated in FIG. 2C, where a cursor 204 is shown selecting multiple words 205 of a sentence. Thus, as illustrated by the example scenarios, the user is not limited to selecting a particular amount of text.

In some scenarios an initial selection may include a contiguous series of words (a phrase). In some scenarios, multiple, non-contiguous words or phrases may be selected by highlighting, circling or underlining with a digital stylus. Multiple words or phrases of interest also may be prioritized by the user. For example, one word or phrase may be marked as the primary text selection of interest, and other related words may be marked as supporting words or phrases which are of secondary, but related interest.

Furthermore, even a scenario in which the user selects no specific words or phrases for the contextual information lookup is envisioned. In one such scenario, the input for initial text selection may be discerned from passive, rather than active, interactions by the user. For example, while the user is scrolling through the text rendered by an application, a paragraph on which the user lingers for a significant time might constitute an initial text selection. As an additional example, if the computing device allows the user's eye movements to be tracked, words or phrases on which the user's eye lingers may form the input for initial text selection. In yet another example, the entire document, window, or page may be considered to be selected based on a passive interaction.

Figure 2D:
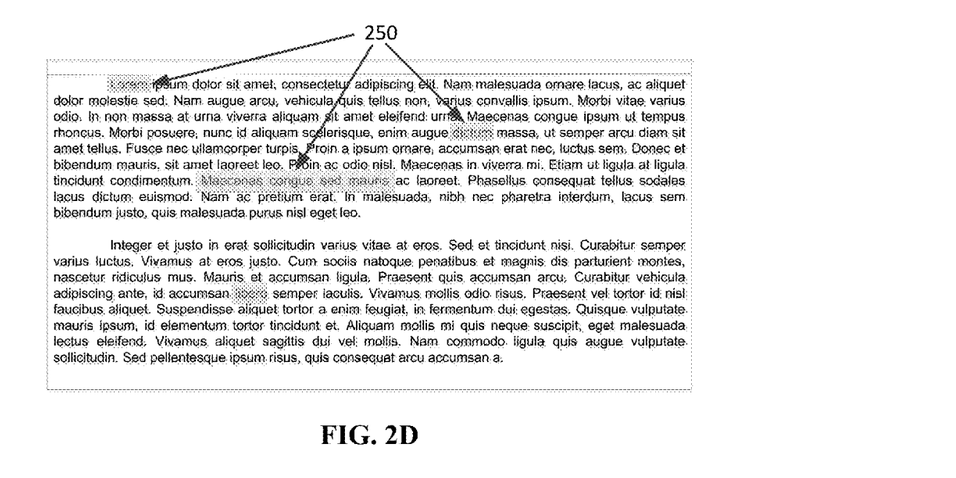

In some implementations, a user may not include an indication of selected text (152), but still indicate that a contextual search mode is desired. In one such implementation, the contextual search may treat the indication of contextual search mode (either from an implied indication or an explicit action by a user) as being a selection of the entire page or document (or at least a viewable portion of the page or document) and present keywords or phrases that may be of interest to the user, such as illustrated in FIG. 2D. A user may then select one or more of the highlighted (or otherwise indicated) terms 250 to initiate the contextual search service (and receive the contextual search results (156)).

Figure 3:
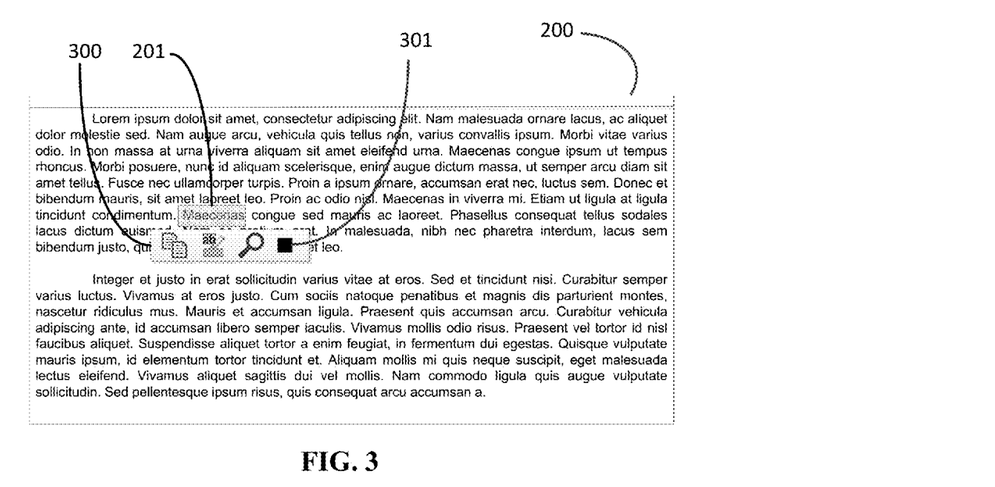
FIG. 3 illustrates an example command interaction indicating an initial selection of text for contextual search.

In some implementations, the interaction indicating an initial selection of text may also involve selection of a contextual search mode (or specific contextual search command) from a menu or particular interaction with the user interface (which may include an object oriented user interface (OOUI) and/or graphical user interface (GUI) element). The selection of the contextual search mode may occur before or after text is selected by the user. For example, as illustrated in FIG. 3, selection of a word 201 (or a "right click" or other action) may cause a menu 300 to surface with command options that may be available for a user to perform with respect to the selected text. A user may select a contextual search command element 301 from the menu 300 in order to invoke the contextual search.

Returning to FIG. 1B, once the indication for initial text selection (152) is received, the selected portion (even if only a point such as illustrated in FIG. 2B or the entire page, window, or document when no specific selection is indicated) and additional information (153) is sent to a contextual search service 120. The additional information can be referred to as selection context.

"Selection context" refers to supplementary information not specifically part of the user's initial text selection. The selection context is utilized by the service to improve the relevance or clarity of the contextual search results by enhancing a traditional web search with additional information. The additional information which collectively forms the selection context will vary by embodiment and scenario, but in some embodiments will include such information as the text surrounding the selection (which can also be referred to as an expanded portion of text, for example, a certain number of symbols or characters before and/or after the selection), the type of application in which the text is displayed, or the type of device on which the application runs.

In some embodiments, the selection context may include relevant and related prior searches the user has performed through the service or on the device generally. Device type and user history may also be included as selection context. For example, previous selections by the user may be used as part of the selection context. In addition, or alternatively, previous selections by other users (and statistical probabilities based thereon) may be used as part of the selection context. Some embodiments may also send the type of user, e.g., whether the user is working from inside a corporate network or outside. In the former case, the user might find work-related results more relevant, while in the latter, more home or consumer-related results may be useful. In a given embodiment, availability of computing resources may also be part of the context, enabling searching of additional resources like corporate intranets.

The contextual search service can process the initial text selection and selection context by refining the initial text selection into a second, "proposed" text selection based on the selection context and generating queries to Internet and/or intranet search services using the proposed text selection. The second text selection may be an expansion or a reduction of the initial text selection. In most scenarios, the contextual search service will possess processing logic to intelligently refine the initial text selection into a more relevant search. However, the service may exist at one or many different layers in the computing device architecture, including on the local device, on a shared resource inside a private network, or on the internet itself.

The service may request information from a single search engine, or it may consolidate the results of many search engines. The service may also search information available on local network resources or intranets. The word "service" itself may denote one or more services at different physical locations in communication with one another. A communications link with a contextual search service may be accessible to an application in any number of ways implemented by the underlying device operating system, or by programming frameworks layered atop it, including but not limited to an API.

As mentioned above, the contextual search service processes the initial text selection and selection context and returns a second (or more), proposed text selection(s) in response (e.g., the identified text selection(s)) (154). The identified text selection(s) can be displayed (155) in the UI 100 (and/or on separate device 118) so that the user can see what was understood by the system to be selected and adjust the selection if needed. In addition to receiving an indication of the identified text, relevant results can be received (156) from the contextual search service.

The identified text selection(s) can be indicated in the application using various visual motifs such as highlighting, underlining, bolding, animation, flashing text, font size, font style, and font color so that the user is made aware of what the application understands the user's intent to be. In some cases, the identification can also include an audio indication. By presenting the identified text selection(s) to the user, the user may refine or otherwise adjust the identified selection. For example, the user may select or deselect terms from the identified selection (157). The refinement may be sent to the service (158) to generate new contextual results, which then returns the refined contextual results (159). The original contextual results and/or the refined contextual results may or may not be immediately displayed to the user (160). The UI 100 (and contextual search component 106) can select the results that are displayed as well as present the results in a particular manner (160).

Figure 4:
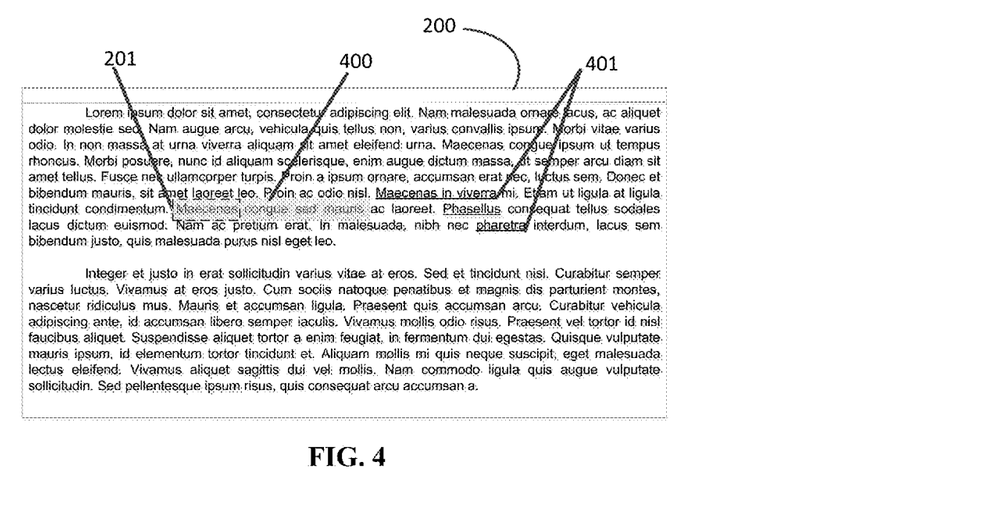
FIG. 4 illustrates an example view of an application user interface surfacing identified terms from a contextual search.

In some scenarios the identified text selection(s) can include terms and phrases that the contextual search found relevant to the search and these supporting/contextual terms may be displayed to the user, such as illustrated in FIG. 4. In another embodiment (not shown), an interface showing the percentage weight of the different words or phrases may be displayed. Many such visual signals indicating the factors used by the service to refine the search from the initial selection text are possible.

In some embodiments, the user may adjust the proposed second selection by invoking a command to modify the proposed selection, for example, by de-selecting words not considered to be relevant to the search. That is, according to an implementation, a user may refine the supporting/contextual terms (161) in order to further refine the contextual results (162). The service may then generate further refined contextual results (163), which can be displayed to the user (164).

Referring to FIG. 4, the initial text selection of a single word 201 in the user interface 200 has been refined by the addition of words to form a phrase 400. For example, the user may have selected Eleanor and the contextual search service determined that the intended selection was "Eleanor Roosevelt".

As further illustrated in this example, text 401 which was determined by the service to be particularly relevant to the search (from the additional text sent to the service as part of the selection context) can be displayed to the user to denote to the user additional factors which the service considered. Although underline is shown in this example, it should be noted that a many types of visual signals or elements may be used to depict the proposed/identified text selection (and/or contextual terms).

In one embodiment, the user's initial text selection (where applicable) may be denoted by highlighting of one color, while the additional text presented in the UI in response to receiving the identified text selection(s) may be denoted by highlighting of at least a second color (e.g., there may be additional colors or distinctions provided depending on relevancy to the original selection, number of times the additional text was used in a query, and the like). For example, words of varying importance "levels" may be highlighted in different colors. In addition, contextual terms may be highlighted to let the user understand why a particular result is returned.

Processing may begin with the receipt of relevant results. The results can be analyzed and grouped for displaying to a user 110. A hierarchical presentation of the relevant results may be available such that a user can delve deeper into a topic or result while within the UI 100. Thus, the results may first be displayed as preview results (160) and then in response to receiving an indication of a result selection (165) from within the UI 100, a next level of information may be displayed (166). Although only two layers of results (the preview results and then immersive results) are illustrated in the figure, multiple layers may be possible. At any time, context refinement (161) and/or selection refinement (157) may be performed, resulting in modifications to the displayed results.

According to certain implementations, once the results of the contextual search are received, a hierarchical interface can be presented within the original application context for displaying relevant results.

The user interface (e.g., UI 100) can enable "disambiguation" so that a user may perfect an incorrect understanding of intent. For example, the identified selection (and contextual results) may be wrong (i.e., not related to the intended selection). As an illustration, if a user selects 'Chicago' in a travel guidebook, and the contextual results are directed to the musical, the user may clarify the intent through one or more available mechanisms. For example, a list of possible suggestions may be presented when the system (or service) determines that the probability of a correct result is below a particular threshold. In addition, the user may still be given the opportunity to correct or adjust the selection even when the results with a higher than threshold likelihood of being correct are provided.

Accordingly, in various implementations, a user may override the identified selection as well as clarify or correct the contextual entity or articles (e.g., terms) selected by the service as relevant to context.

The user interface may include interactive views of the relevant results, grouped into modules. As used here, an "interactive" view refers to a view where the user may select a relevant result by clicking with the mouse, using a touch gesture, or any other user selection indicia known in the art. An interactive view also allows the user to scroll content, select and copy text, or select links within content to additional content. A user may navigate through multiple levels to achieve an in-depth exploration of a subject. In some embodiments, an interactive view may be rendered using a standardized web markup language such as HTML or JSON, but other rendering methods are possible.

Figure 5A:
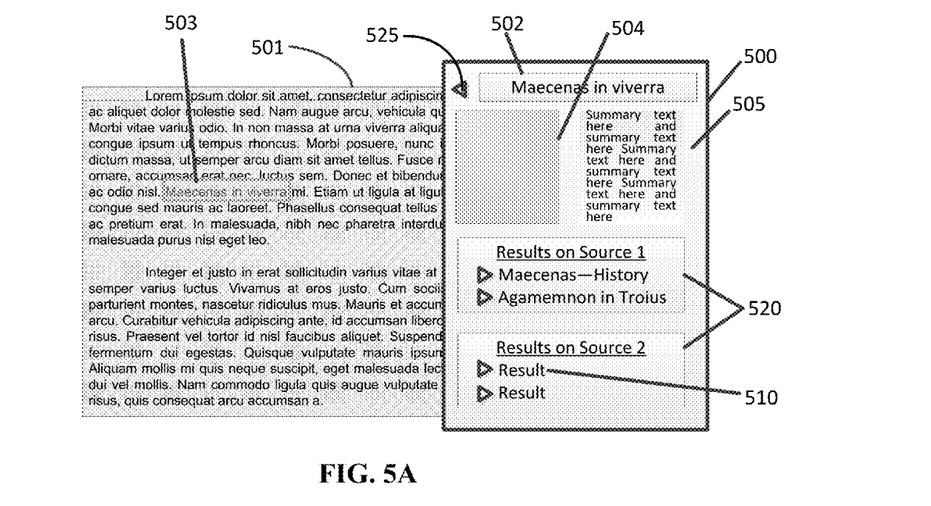
FIGS. 5A-5B illustrate an example preview contextual result interface.
Figure 5B:
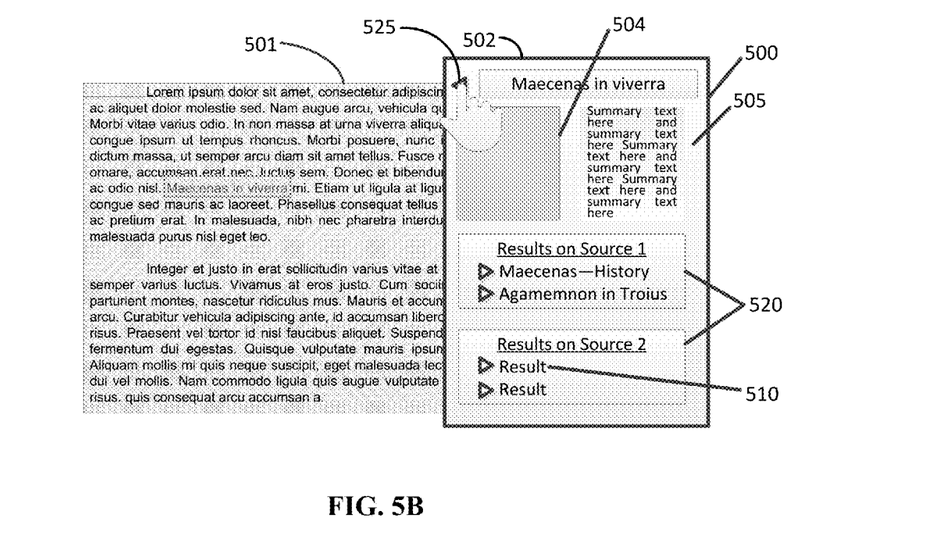

FIGS. 5A-5B illustrate an example preview contextual result interface. FIGS. 6A-6D illustrate example expanded contextual result interface views and result groupings that may be generated for the user interface.

Referring to FIG. 5A, a preview pane 500 can be displayed non-obtrusively atop the existing application surface 501, only partly obscuring the content displayed in the application surface 501. In the example preview 500, a quick summary can be provided that may include a title 503 (as provided by the identified text 503), an image (still or moving) 504 (if available) and summary text 505 (if available). Other arrangements and elements for summarizing the topic of the search are possible. Also included in the example preview pane 500 is a preview of each module of the relevant results.

In particular, to enable a user to navigate the relevant results, the relevant results 510 can be grouped by the application into modules 520. In the example illustrated in FIG. 5A, the relevant results 510 are grouped by source.

"Source," in this context, may mean a network location, website, type of application, type of result (such as an image) or other logical method of grouping results. Some examples of sources might be the Wikipedia online encyclopedia; a local network source, such as an internal web server and/or social graph, privately available to the users in a company; a particular news website; image files from a photo-sharing website; structured data from a database; or private files on the user's drives or personal cloud storage.

It should be noted that the modular groupings may be displayed differently based on contextual information about the user. For example, a user at home may receive consumer or entertainment-oriented information sources. The same user might receive different groupings (and, as noted above, different results) when at work. Many such forms of groupings are possible.

FIG. 5B illustrates one entry mechanism to an expanded view of relevant results. In the example, a user may select an expansion command 525 in order to view the expanded view. Selection via a touch gesture is depicted in the embodiment in FIG. 5B, but other methods of selecting a command commonly known in the art are possible. In some implementations, the preview pane 500 may be interactive. If a user selects one of the modules or one of the results in a module, additional information may be surfaced within the preview pane 500 or the selection of an element in the preview pane may cause the expanded view to launch.

Figure 6A:
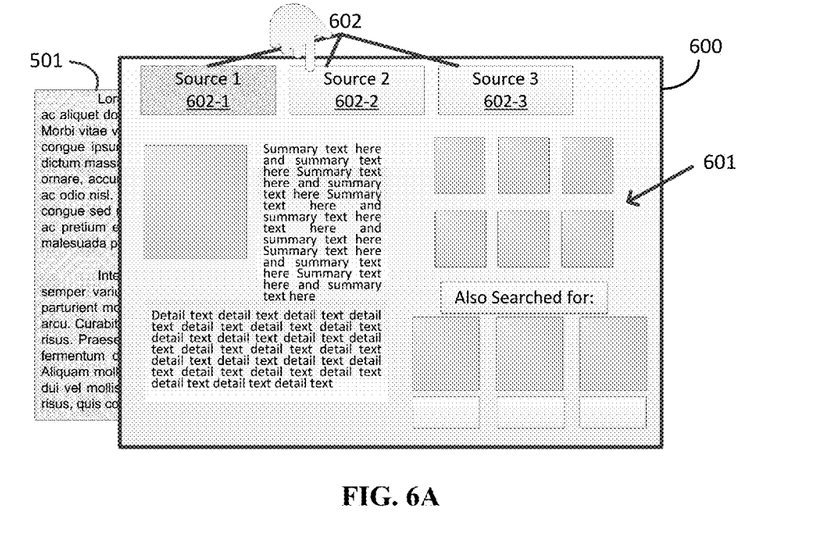
FIGS. 6A-6C illustrate example expanded contextual result interface views and result groupings that may be generated for the user interface.

FIG. 6A illustrates an example user interface in which the interactive expanded view 600 is displayed atop the existing application surface 501, replacing the preview pane 500 while maintaining the original application context.

Figure 6B:
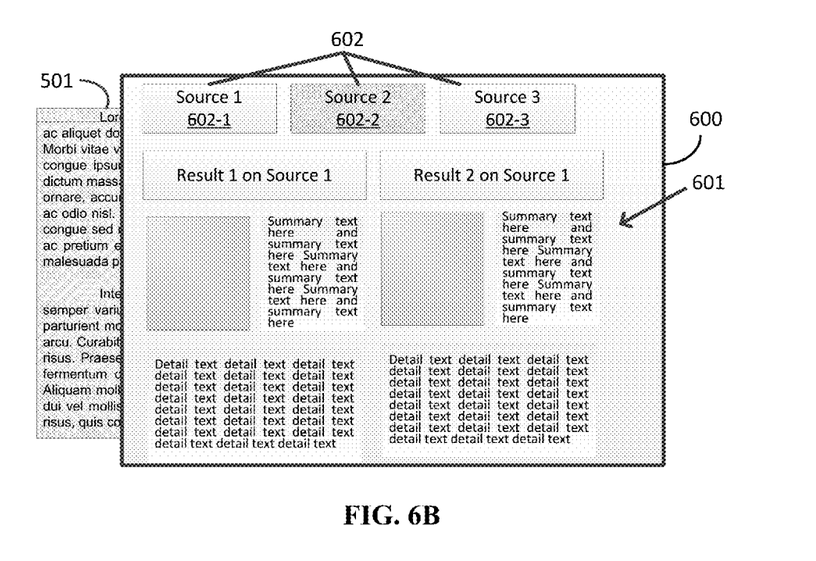

In FIG. 6A, the results 601 available from a given source 602 may be viewed in detail (e.g., the results of Source 1 602-1). In some cases, a user may navigate between results grouped in pages according to source. When the user selects a different source 602, the interactive expanded view 600 can surface results from the selected source (e.g., Source 2 602-2) as shown in FIG. 6B.

Figure 6C:
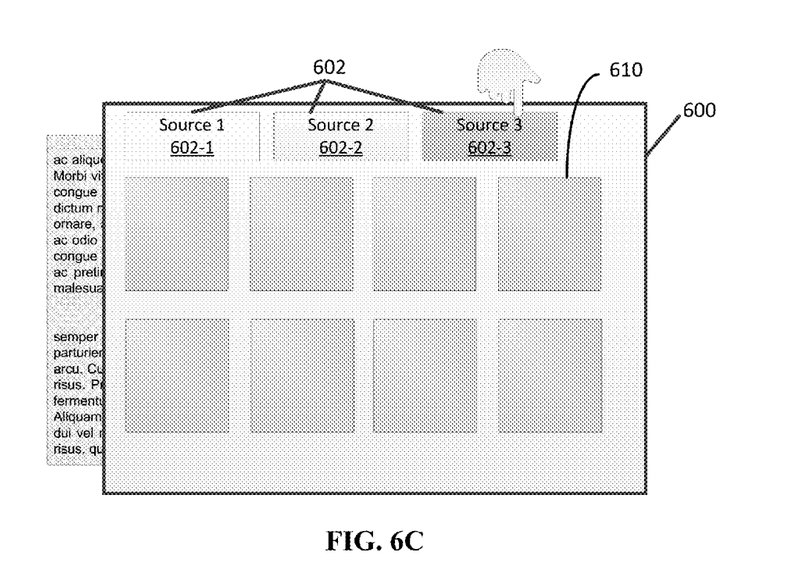

The results for each source may be arranged in a manner suitable for its content. For example, one source may be suitable for a mixed content arrangement such as shown in FIG. 6A, while another source such as shown in FIG. 6B may depict content in a columnar, article-style layout (which can be suitable for a source such as Wikipedia). Other layouts may be suitable for content from different sources. For example, a source (e.g., Source 3 602-3) that generates primarily images 610 may include a thumbnail layout as illustrated in FIG. 6C. Many other layouts of content are possible. For example, a view for source of web results may use a layout with tabular previews. In addition, some or all of the information may be provided to a separate device and/or saved for later.

In some cases, scrolling and/or zooming may be utilized to access the available results within the interactive expanded view.

Figure 6D:
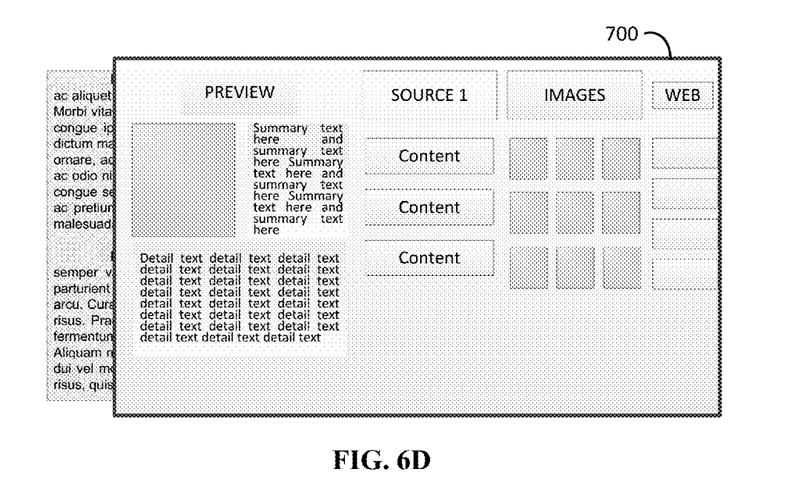
FIG. 6D illustrates an example expanded contextual result interface view and result grouping that may be generated for the user interface.

In some implementations, the interactive expanded view 600 may be similar to the preview pane 500 in that a preview of the results from each source may be displayed. FIG. 6D illustrates an example where all results may be provided in the interactive expanded view 650. From the interactive expanded view, the user may further explore the results of a particular source by selecting a link, title, source name, or other entry point.

In some implementations, the results shown in the interactive expanded view 600, 650 can include links. If a user selects to follow a link, the link can be launched in a browser window separate or within the interactive expanded view 600, 650.

Figure 7:
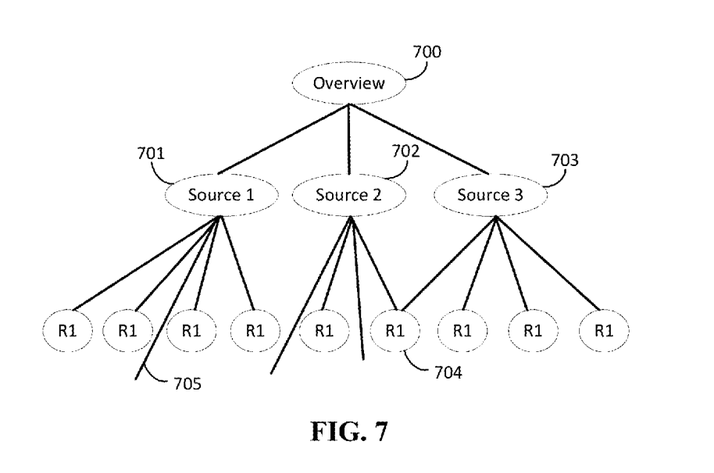
FIG. 7 illustrates an example hierarchy of search results based on source.

FIG. 7 illustrates an example hierarchy of relevant results based on source. In FIG. 7, a top node may be the overview node 700. From this overview node 700, the sources (e.g., source 1 701, source 2 702, and source 3 703) are known as well as any preview results passed through to the overview from the source level nodes. Sometimes a source node may include overlapping results with another source node (e.g., result 704 may be available through source 2 702 and source 3 703), for example, where one of the sources is defined as any images and another source includes an image in its results.

In some cases, not all results that are received will necessarily be included in the hierarchy of relevant results navigable through the interactive expanded view. For example, when the results are organized, an analysis of the results with respect to one or more aspects related to context may be performed. Results deemed to not be relevant may be omitted (e.g., as an omitted result 705). In some cases, context may refine the presentation of source results. For example, an article in one language may be different than that written in a second language and the selection between presenting results from the two sources can be made based on the location of the user and/or previous selection history.

FIG. 8 shows a block diagram illustrating components of a computing device used in some embodiments (e.g., user device 112). System 800 may be implemented within a single computing device or distributed across multiple computing devices or sub-systems that cooperate in executing program instructions. System 800 can be used to implement myriad computing devices, including but not limited to a personal computer, a tablet computer, a reader, a mobile device, a personal digital assistant, a wearable computer, a smartphone, a laptop computer (notebook or netbook), a gaming device or console, a desktop computer, or a smart television. Accordingly, more or fewer elements described with respect to system 800 may be incorporated to implement a particular computing device.

System 800, for example, includes a processor 805 which processes data according to the instructions of one or more application programs 810 interacting with the device operating system (OS) 815. Examples of processors 805 include general purpose central processing units, application specific processors, and logic devices, as well as any other type of processing device, combinations, or variations thereof.

The application programs 810, OS 815 and other software may be loaded into and stored in a storage system 820. Device operating systems 815 generally control and coordinate the functions of the various components in the computing device, providing an easier way for applications to connect with lower level interfaces like the networking interface. Non-limiting examples of operating systems include WINDOWS from Microsoft Corp., IOS from Apple, Inc., ANDROID OS from Google, Inc., WINDOWS RT from Microsoft, and the Ubuntu variety of the Linux OS from Canonical.

It should be noted that the OS 815 may be implemented both natively on the computing device and on software virtualization layers running atop the native Device OS. Virtualized OS layers, while not depicted in FIG. 8, can be thought of as additional, nested groupings within the OS 815 space, each containing an OS, application programs, and APIs.

Storage system 820 may comprise any computer readable storage media readable by the processor 805 and capable of storing software (e.g., application programs 810 and OS 815).

Storage system 820 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage medium a propagated signal. In addition to storage media, in some implementations storage system 820 may also include communication media over which software may be communicated internally or externally. Storage system 820 may be implemented as a single storage device but may also be implemented across multiple storage devices or sub-systems co-located or distributed relative to each other. Storage system 820 may comprise additional elements, such as a controller, capable of communicating with processor 805.

Software may be implemented in program instructions and among other functions may, when executed by system 800 in general or processor 805 in particular, direct system 800 or processor 805 to operate as described herein. Software may include additional processes, programs, or components, such as operating system software or other application software. Software may also comprise firmware or some other form of machine-readable processing instructions executable by processor 805.

In general, software may, when loaded into processor 805 and executed, transform computing system 800 overall from a general-purpose computing system into a special-purpose computing system customized to facilitate the contextual information lookup and navigation process flow as described herein for each implementation. Indeed, encoding software on storage system 820 may transform the physical structure of storage system 820. The specific transformation of the physical structure may depend on various factors in different implementations of this description. Examples of such factors may include, but are not limited to the technology used to implement the storage media of storage system 820 and whether the computer-storage media are characterized as primary or secondary storage.

For example, if the computer-storage media are implemented as semiconductor-based memory, software may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be noted that many elements of system 800 may be included in a system-on-a-chip (SoC) device. These elements may include, but are not limited to, the processor 805, a communications interface 835, an audio interface 840, a video interface 845, and even elements of the storage system 820.

Communications interface 835 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS 815, which informs applications and APIs of communications events when necessary.

Interface devices 850 may include input devices such as a mouse 851, track pad, keyboard 852, microphone 853, a touch device 854 for receiving a touch gesture from a user, a motion input device 855 for detecting non-touch gestures and other motions by a user, and other types of input devices and their associated processing elements capable of receiving user input.

The interface devices 850 may also include output devices such as display screens 856, speakers 857, haptic devices for tactile feedback, and other types of output devices. In certain cases, the input and output devices may be combined in a single device, such as a touchscreen display which both depicts images and receives touch gesture input from the user. Visual output may be depicted on the display 851 in myriad ways, presenting graphical user interface elements, text, images, video, notifications, virtual buttons, virtual keyboards, or any other type of information capable of being depicted in visual form. Other kinds of user interface are possible. User interface 850 may also include associated user interface software executed by the OS 815 in support of the various user input and output devices. Such software assists the OS in communicating user interface hardware events to application programs 810 using defined mechanisms.

It should be understood that computing system 800 is generally intended to represent a computing system with which software is deployed and executed in order to implement an application with the contextual information lookup and navigation process flow as described herein. However, computing system 800 may also represent any computing system on which software may be staged and from where software may be distributed, transported, downloaded, or otherwise provided to yet another computing system for deployment and execution, or yet additional distribution.

Figure 9:
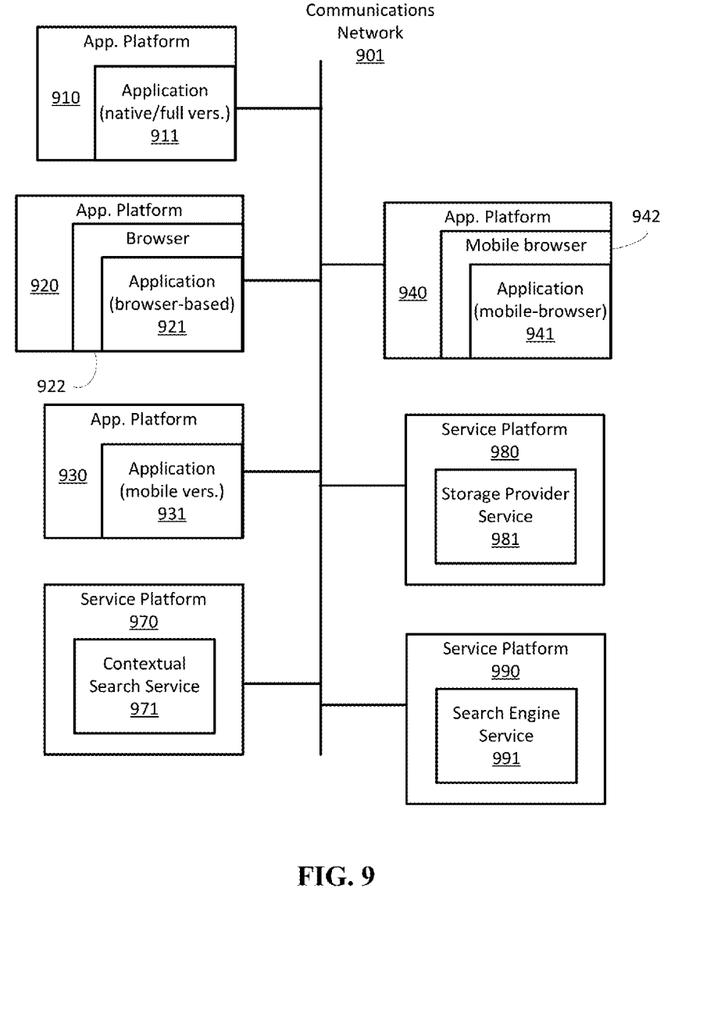
FIG. 9 illustrates example system architectures in which embodiments may be carried out.

FIG. 9 illustrates an application environment 900 in which an application with the proposed improvements may be implemented utilizing the principles depicted in system 800 (FIG. 8) and discussed above. In particular, FIG. 9 shows various application platforms 910, 920, 930, and 940, each of which is capable of communicating with service platforms 970 and 980 over communications network 901 to perform the contextual search and return the relevant results. The application platforms 910, 920, 930, and 940 may be any computing apparatus, device, system, or collection thereof employing a computing architecture suitable for implementing the application (911, 921, 931, 941) on that platform.

In some embodiments, the described interfaces and process flow may be implemented within applications designed to view and manipulate textual content. In other embodiments, the functionality of detecting text selections and non-intrusively rendering relevant results according to the described methods may be implemented by the OS or by layered components accessible to the applications via API.

Application 911 may be considered a full or "native" version that is locally installed and executed. In some cases, application 911 may operate in a hybrid manner whereby a portion of the application is locally installed and executed and other portions are executed remotely and then streamed to application platform 910 for local rendering. Non-limiting examples of application 911 include word processors such as Microsoft® Word; email applications; electronic readers like Microsoft® Reader or Amazon Kindle® Reader; and note-taking applications such as Microsoft OneNote®, Evernote®, or Google Keep™.

Browser-based application 921, implemented on application platform 920, may be considered a browser-based version that is executed wholly or partly in the context of a browser application 922. In this model, all or part of the programming instructions are executed remotely and the browser 922 renders the result to the user's device through a visual expression language such as HTML. A non-limiting example of a browser-based application 921 is the Microsoft® Word Web App Service available through Microsoft SkyDrive®. Examples of the browser application 922 include Google Chrome™, Microsoft Internet Explorer™, and Mozilla Firefox™.

Application 931 may be considered a mobile application version that is locally installed and executed on a mobile device. In some cases, application 931 may operate in a hybrid manner whereby a portion of the application is locally installed and executed and other portions are executed remotely and then streamed to application platform 930 for local rendering. Non-limiting examples of mobile applications 931 include QuickOffice® HD on the Google Android™ and Apple IOS™ devices.

Application 941, implemented on application platform 940, may be considered a browser-based version that is executed wholly or partly in the context of a mobile browser application 942. In this model, all or part of the programming instructions are executed remotely and the mobile browser 942 renders the result to the user's device through a visual expression language such as HTML. Non-limiting examples of a mobile browser-based application 941 include mobile-device-enhanced views of content through Microsoft SkyDrive®, Google Drive™. Examples of the mobile browser application 942 include Google Chrome™ and Mozilla Firefox™.

The application platforms 910, 920, 930, and 940 may communicate with service platforms 970 and 980 connected by network 901. Service platforms may deliver a variety of services useful to the application platforms and applications capable of performing contextual information lookup and navigation as described herein. For example, service platform 970 may deliver the contextual search service 971 which enables the processing and contextual shaping of search text described above. The contextual search service may also retrieve, sort, and group relevant results from search engines for presentation by the interface described above. Service 971 may also host remote programming instructions and render their results to applications or browsers on any of the application platforms. The contextual search service 971 may be implemented using one or more physical and/or virtual servers communicating over a network.

In addition, service platform 980 may deliver storage provider service 981, which enables non-local storage of files or other data which can be utilized by applications 911, 921, 931, and 941, and by contextual search service 971. For example, storage provider service 981 might be a cloud storage provider, a database server, or a local area network file server. The contextual search service may contain functionality for searching these storage providers for content and presenting the results in a grouped manner as described herein. Non-limiting examples of storage provider services include Microsoft SkyDrive®, Google Drive™, DropBox™, Box™, and Microsoft® SQL Server.

In addition, service platform 990 may deliver search engine service 991, which enables relevant results to be located and returned to applications 911, 921, 931, and 941, and to the contextual search service 971. For example, search engine service 991 might be an internet search engine such as Bing.com or Google.com, or a search engine available on a private network such as Microsoft® Search Server Express.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A method of facilitating contextual information lookup and navigation within an application, the method comprising:
   receiving an indication of an initial content selection from a user in an application in which the user is consuming or creating content, the content comprising text displayed via a user interface of the application and the initial content selection being from within a region of the user interface where the text is displayed;
   in response to receiving the indication of the initial content selection from within the region of the user interface where the text is displayed, determining an identified selection from the initial content selection, refining the identified selection based on an expanded portion of content including at least a portion of text that is from within the region of the user interface where the text is displayed and that surrounds identified selection, and determining a plurality of contextual search results generated based on the identified selection by using the initial content selection and a selection context including the expanded portion of content surrounding the identified selection.

2. The method of claim 1, wherein receiving the indication of the initial content selection from the user comprises an inherent or explicit selection of an entire page, document, or view window;
   wherein the identified selection comprises entities and topics for attention of the user.

3. The method of claim 1, wherein determining the identified selection and the plurality of contextual search results generated based on the identified selection by using the initial content selection and the selection context comprises:
   sending the initial content selection and the selection context to a contextual search service; and
   receiving the identified selection and the contextual search results from the contextual search service.

4. The method of claim 1, further comprising displaying an interface element which allows the user to modify the identified term, and
   in response to receiving a modification to the identified term, sending the modification to a contextual search service to generate updated contextual search results.

5. The method of claim 1, wherein the selection context further comprises one or more of prior search history and information of an application type of the application or information of a device type on which the application is running.

6. The method of claim 1, further comprising:
   organizing the contextual search results into a hierarchy based on source, wherein the source comprises at least one of network location, website, type of application, and type of result;
   displaying a preview of the contextual search results; and
   in response to receiving an indication of a selection for an expanded view from the preview of the contextual search results, displaying an interactive expanded view from which the user navigates the hierarchy.

7. The method of claim 6, wherein the preview is displayed in a separate device from that in which the user is consuming or creating the content.

8. The method of claim 1, further comprising:
   displaying the identified selection and one or more proposed terms from the at least the portion of text surrounding the identified selection that are used for generating the plurality of contextual search results.

9. The method of claim 8, wherein the contextual search results are generated by a contextual search service, the method further comprising:
   receiving one or more context terms selected by the contextual search service for use in generating the contextual search results; and
   displaying the one or more context terms as the one or more proposed terms.

10. The method of claim 9, further comprising:
   employing a visual signal identifying each of the one or more proposed terms indicating a percentage weight assigned based on relevancy.

11. The method of claim 8, further comprising displaying an interface element which allows the user to modify the one or more proposed terms, and
   in response to receiving a modification to the one or more proposed terms, generating new contextual search results based on the modification.

12. An apparatus comprising:
   one or more computer readable storage media; and
   an application for consuming or creating content including a contextual search component, the application embodied in program instructions stored on the one or more computer readable media that, when executed by a processor of a processing system, direct the processing system to:
   render a user interface comprising:
      a content view of content being consumed or created by a user, the content view including a contextual search element through which to engage the contextual search component;
      a preview view of contextual search results organized in a hierarchy based on source and rendered in response to receiving the contextual search results; and an interactive expanded view rendered in response to receiving an indication of a selection for an interactive expanded view from the preview view and including interface elements through which the user navigates the hierarchy, wherein the interactive expanded view enables the user to navigate to a particular contextual result via selection of a link, a title or a source name; and determine an information source associated with each result of the contextual search results; group the contextual search results by their determined information source; and present the groups according to the hierarchy based on source in the preview view, wherein a layout of the presented contextual results is based on the type of content of the information source.

13. The apparatus of claim 12, wherein the content view surfaces an indication of an identified selection of content in response to receiving an indication of an initial content selection and an indication of an engagement of the contextual search component through the contextual search element.

14. The apparatus of claim 13, wherein the indication of the identified selection of content comprises a visual motif selected from a group consisting of highlighting, underlining, bolding, font style, and font color.

15. The apparatus of claim 13, wherein the content view further surfaces an interface element which allows the user to modify the identified selection and engage a contextual search service to generate updated contextual search results.

16. The apparatus of claim 12, wherein the source comprises at least one of network location, website, type of application, and type of result.

17. A reader apparatus comprising:
one or more computer-readable storage media;
an input device; and:
program instructions stored on the one or more computer readable media that, when executed by a processor of a processing system of the reader apparatus, direct the processing system to at least:
render a document for display;
receive, via the input device, an indication of an initial content selection in the document and a request for contextual search of the initial content selection;
in response to the request for the contextual search, send the initial content selection and a selection context comprising an additional portion of text surrounding the initial content selection to a contextual search service;
present an identified selection to a user, wherein the identified selection based on the initial content selection and the selection context, wherein the identified selection includes one or more proposed terms from the additional portion of text surrounding the initial content selection determined to be relevant to the initial content selection;
render a visual motif in the document to indicate the two or more identified selection terms;
enable the user to select and deselect from the identified selection to refine the identified selection;
receive the refined identified selection and contextual search results from the contextual search service;
organize the contextual search results in a hierarchy based on source;
render an interactive view of the organized contextual search results; and
enable the user to further refine the contextual results by selecting and deselecting one or more of the rendered contextual results.

18. The reader apparatus of claim 17, wherein the initial content selection is a point within text.

19. The reader apparatus of claim 17, wherein the initial content selection is a single word of text.

20. The reader apparatus of claim 17, wherein the initial content selection comprises at least one word of text.

21. The reader apparatus of claim 17, wherein the selection context further comprises prior search history.

* * * * *